Oct. 1, 1935.  R. E. WILSON  2,016,065

CARBON SAVER

Filed Feb. 7, 1935

INVENTOR.
Russell E. Wilson.
BY
Louis J. McBane
ATTORNEY.

Patented Oct. 1, 1935

2,016,065

UNITED STATES PATENT OFFICE 2,016,065

CARBON SAVER

Russell E. Wilson, Cleveland, Ohio

Application February 7, 1935, Serial No. 5,392

7 Claims. (Cl. 176—119)

This invention relates to improvements in carbon savers useful, for example, in motion picture projection machines.

Motion picture projectors, and other illuminating devices, are provided with supports for holding the carbons and are operable to advance the carbons, as they burn away, to maintain the arc. A considerable part of the carbon is engaged by such support and is not available to form an arc; enough of the carbon must be discarded to be unduly expensive.

Carbon savers have been devised and used heretofore, adapted to be used with conventional supports and carbons, which engage only a small length of the carbon and which, by conventional operation of the support, may be brought close to the arc region so that nearly all of the carbon is used to form an arc. Worthwhile savings in the use of carbons, as compared to the waste without such carbon savers, are effected.

It is an object of this invention to provide a new carbon saver which is inexpensive to manufacture and is easy to install and use.

It is essential that the carbon be supported in a direction which is accurately parallel to the direction of movement of the support as it advances to feed the carbon to the arc. It is an object of this invention to provide a new carbon saver which inherently operates to align the carbon when mounting it, without skill or especial attention on the part of the operator, by the simple operation of fastening the carbon in the carbon saver.

A particular type of projector may be designed for optional use of carbons of different size. It is an object of this invention to provide a new carbon saver equally adaptable for use with carbons of different size, over a limited range, and operating to grip each size of carbon in the same way and equally well.

Some projectors have guides for the carbon arranged near to the arc, to insure correct positioning of the carbon ends. Such guides, to be effective, do not allow for much play of the carbon, so that there is little clearance between the carbon and the guides. It is an object of this invention to provide a carbon saver equally adaptable and useful whether or not such guides be present, which is adapted to pass through such guides as the carbon is advanced.

Other objects and advantages of the present invention will appear in the following detailed description taken in connection with the accompanying drawing in which.

Figure 1:
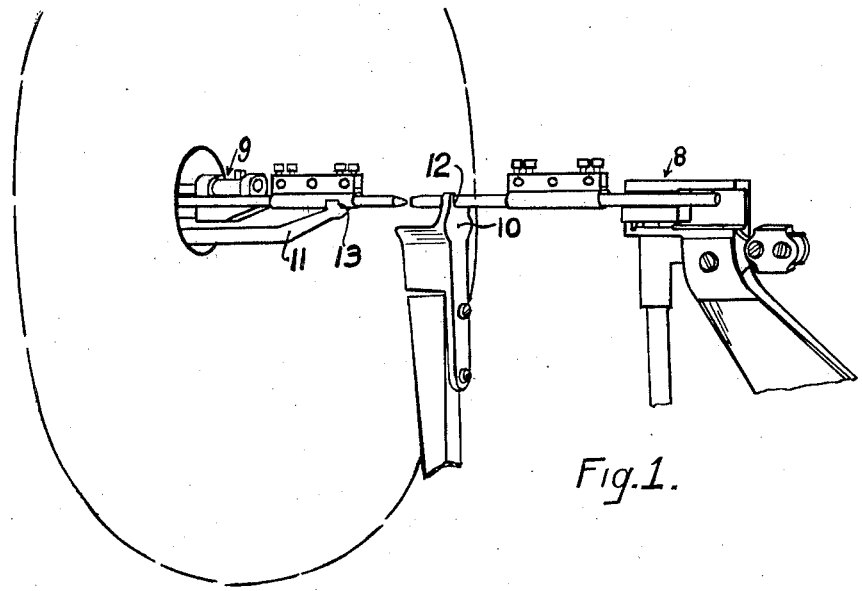
Figure 1 is a view in perspective of certain details of a motion picture projecting machine and the device of this invention in use therewith.
Figure 2:
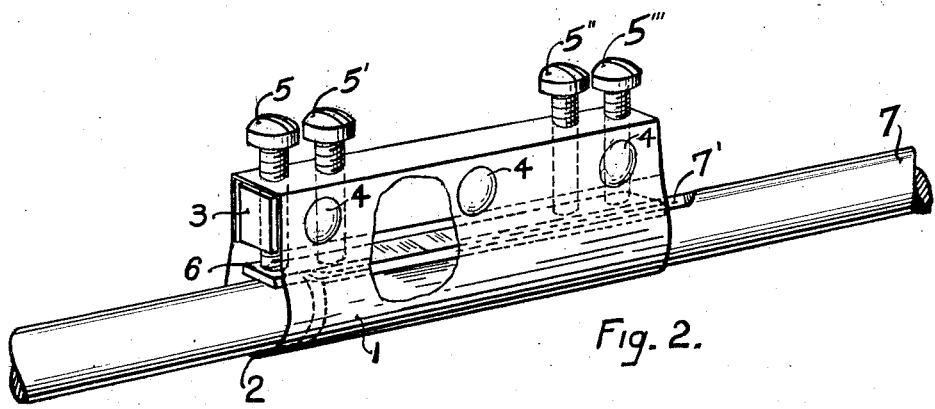
Figure 2 is a detail view in perspective, illustrating the device of this invention.

It is essential that the carbon holder have a secure support for the carbon during operation of the projector. It is also essential that the carbon be kept in alignment. It is desirable that the carbon holder be simple and adjustable and adaptable in use.

According to this invention the construction provided for engaging the carbon securely to hold it in mounted position consists, in part, of a thin sheet metal sleeve or envelope 1 desirably of steel. This sleeve or envelope 1 may be made of what is known in the trade as shim stock which is thin sheet metal somewhat flexible and resilient. As shown on the drawing the sheet metal is doubled upon itself to form a substantially semi-circular trough 2 within its interior into which a carbon may be arranged. Due to the flexibility and resilience of the sleeve 1, the walls of the sleeve inherently shape themselves into conformity with the carbon so as to engage and press against the carbon, along a considerable length and throughout a considerable arc, thus a large area of engagement between the carbon and the sleeve 1 is provided which makes for secure mounting of the carbon and insures that the carbon will be held in only that direction which is determined by the arrangement of sleeve 1.

In order to give the sleeve 1 rigidity in lengthwise direction and also to provide a supporting structure for the thin sheet metal which forms sleeve 1, a bar of metal 3, desirably of steel, is provided. The ends of the sheet metal blank, from which the sleeve 1, is made, are bent around the bar and secured in place in engagement with the bar 3 by any suitable means such as the rivets 4 passing through the sheet metal stock and through the bar 3. As shown in the drawing, the bar is sufficiently large in cross section to be quite rigid. The rigidity of bar 3 insures that the axis of the trough 2 shall be uniform throughout the length of sleeve 1 and not subject to variation by improper or careless handling of the device.

In order to secure a carbon in place in the trough 2 in sleeve 1, one or more screws 5 may be threaded through the apertures in the bar 3 so that, by screwing down such screw or screws, its end may be brought into proximity to the end of a carbon arranged in the trough 2. One screw 5 is sufficient for securing a carbon in place, although this invention is not restricted to the use of a single screw for that purpose. Other equivalent devices may be substituted for screws. In order to save carbon only a short length of the carbon is inserted into the trough 2, the screw 5, being close to the end of the trough, engaging the carbon end.

To provide for mounting the carbon saver on a conventional support, the rod 7, which may be of steel, is arranged in the trough 2. The shank of the rod 7 fits into the clamp of the support in place of a carbon. Although the rod 7 may be cylindrical throughout its length, it is desirable to provide a flat 7' on the side of the rod adjacent to the screws 5', 5'', and 5'''. The flat 7' insures that the screws will press against the rod in a direction normal to its axis. Since the lower part of sleeve 1 is flexible and unrestricted except for its connection with the bar 3, when the screws 5', 5'' and 5''' are tightened, the sleeve will be placed under tension and caused to conform to the shaft and will operate to center the rod 7 in the trough. The flat 7' insures that there will be no lateral force exerted by the screws, which would tend to throw the rod 7 off center. It is observed that screws 5' and 5'' are widely separated and that a considerable length of the rod 7 is arranged in the trough 2. All of these factors make for perfect alignment of the carbon saver and the carbon supported by it. Only one of the two screws 5'' and 5''' would be adequate but both ends of the carbon saver are made alike so that it may be reversed.

The screws may bear directly on the flat 7' if desired. Or, a strip of metal 6 may be arranged between the screws and the rod 7, and between the screw 5 and the end of the carbon. The strip 6 protects the carbon from the turning action of the screw. The strip 6, before the screws are tightened, is free in the passage of the trough 2 and, when the screws are being tightened, it adjusts itself to transmit the force of the screws in a direction normal to the axis of the carbon and the rod 7. The sleeve 1 acts to center the carbon accurately, when the screw 5 is tightened, in just the same manner as described before in connection with the rod 7. Since the sleeve 1 is of one-piece and is maintained in an invariable trough like shape by the bar 3 so that the axis of the trough is invariable in direction, the device inherently operates to align the carbon and the bar 7 by the simple operation of securing those elements in place. Obviously, the rod 7 may be replaced by a second carbon, if desired.

It will be observed, in the drawing, that the carbon saver is alike at both ends. A carbon may be inserted and clamped in one end of the holder and either another carbon or a steel shank 7 of the same size as the carbon may be arranged in the other end of the carbon saver. The steel shank 7, or a carbon in place thereof, may be secured in the support of a projector in the conventional manner, as illustrated at 8 or 9 in the Figure 1 of the drawing.

It will be observed, in Figure 1, that the type of projector illustrated involves the use of guides 10 and 11 for the carbons, which guides are arranged at a position close to the region where the arc is formed. The notches 12 and 13, of the guides 10 and 11 respectively, in which the carbons ride, are of a size to receive the carbons with little play or clearance so as to be effective. It will be observed from the drawing that since the sleeve 1 is made of thin sheet metal the effective increase of diameter in the carbon due to the carbon saver is only that of the thickness of the metal so far as that portion of the carbon which engages with the notches 12 and 13 is concerned. For this reason the carbon saver of this invention is adapted for use in a projector having guides as illustrated in 10 and 11 in Figure 1 of the drawing. It may be necessary slightly to enlarge the notches 12 and 13 of the guides to facilitate movement of the carbon saver of this invention in such projectors. However, at the most, very little metal need be removed, it being more important that no ragged or sharp edges be presented which might be engaged by a forward edge of sleeve 1. As shown in Figure 1 of the drawing the carbon saver supporting the negative carbon is riding in the notch 13 of the guide 11. As the positive carbon burns away and is advanced by the mechanism of the projector the carbon saver supporting that carbon will pass through the notch 12 of the guide 11. Thus the carbons may be burned to a very short end with little consequent waste of carbon.

From the foregoing, it will be apparent that the carbon saver of this invention is simple and reliable in operation. Without the exercise of skill, the operation of fastening a carbon in the device will result in mounting the carbon in accurate alignment with the direction of movement of the supporting means of the projector. This feature of the invention is inherent in the structure of the carbon saver by virtue of which it is certain that the carbon will be accurately aligned. While the carbon saver of this invention is adapted for use with projectors of various designs, it is also well adapted for use with projectors having guides as illustrated in Figure 1; carbon savers known to the prior art not be useful with that type of projector.

The inherent flexibility of the sleeve 1 of the carbon saver permits the use of the device with carbons of various sizes, within a limited range, the device operating to engage and to clamp the carbon in place in just the same manner regardless of variations in size of the carbon and operating to insure perfect alignment of the carbon regardless of size.

While the invention has been described in detail by way of illustration, it is not intended so to limit the invention, inasmuch as variations in the details thereof may be made, by one skilled in the art, without departing from the spirit and scope of the invention as defined in the following claims.

What I claim as my invention is as follows:

1. A carbon saver having a flexible sheet metal sleeve affording a trough-like passage to receive the end of a carbon and adapted to closely conform to the carbon, a rigid member to which the sleeve is secured, fastening means mounted on the member and operable to press the end of a carbon laterally against the wall of the trough-like passage to secure the carbon in place.

2. A carbon saver having a flexible sheet metal sleeve affording a trough-like passage to receive the end of a carbon and adapted closely to conform to the carbon, a rigid bar to which the sleeve is secured, the passage being substantially in alignment with the length of the bar, fastening means mounted on the bar and operable to press the end of a carbon laterally against the wall of the passage to secure the carbon in place.

3. A carbon saver having a flexible sheet metal sleeve affording a trough-like passage to receive the end of a carbon and adapted closely to conform to the carbon, a rigid bar to which the sleeve is secured, the bar supporting the sleeve so as to provide a substantially invariable axis for the trough, a metal strip arranged between the side of a carbon and the bar within the passage, fastening means mounted on the bar and operable through the strip to press the end of a carbon laterally against the wall of the passage to secure the carbon in place.

4. A carbon saver having a flexible sheet metal sleeve affording a trough-like passage to receive the end of a carbon and adapted closely to conform to the carbon, a rigid bar to which the sleeve is secured, the bar supporting the sleeve so as to provide a substantially invariable axis for the trough, a metal strip arranged between the side of a carbon and the bar within the passage, screws threaded through the bar into the passage and arranged to engage and to press the strip against the side of the end of a carbon arranged in the passage, the carbon being confined between the strip and the sleeve.

5. A carbon saver having a flexible sheet metal part affording a trough-like passage open at both ends to receive a carbon or rod in either end of the passage, a rigid member supporting the part so as to form the passage and to provide a substantially invariable longitudinal axis therefor, a stiff insert freely arranged between the member and a carbon or rod inserted in the passage, and means mounted on the bar and operable to press the insert laterally against the carbon or rod, the carbon or rod being confined between the walls of the passage and the insert.

6. A carbon saver having a thin flexible sheet metal sleeve affording a trough-like passage open at both ends to receive a rod or carbon in either end of the passage, a rigid bar supporting the sleeve so as to form the passage and to provide a substantially invariable longitudinal axis therefor, a metal strip arranged between the bar and a carbon or rod inserted into the passage, the strip being free from connection with any other element, at least one screw threaded through the bar and extending into the passage to engage and to press the strip laterally against the carbon or rod and to press the carbon or rod laterally against the wall of the passage.

7. A carbon holder adapted for use with carbon guides comprising a thin flexible sheet metal sleeve, means supporting the sleeve to provide a trough-like passage there through, means for recuring the end of a carbon in the passage, the portion of the sleeve in engagement with the carbon conforming closely thereto throughout a substantially semi-circular arc and arranged to pass through the notch of a guide with the carbon as the carbon is advanced.

RUSSELL E. WILSON.